United States Patent [19]

Kuwana et al.

[11] Patent Number: 4,896,924
[45] Date of Patent: Jan. 30, 1990

[54] ANTISKID CONTROL DEVICE

[75] Inventors: Kazutaka Kuwana, Toyota; Tsuyoshi Yoshida, Obu; Shinsuke Sakane, Toyota; Tetsuya Miyachi, Kariya, all of Japan

[73] Assignee: Aisin Seiki Kabushiki Kaisha, Japan

[21] Appl. No.: 339,945

[22] Filed: Apr. 19, 1989

Related U.S. Application Data

[63] Continuation of Ser. No. 240,322, Sep. 2, 1988, abandoned.

[30] Foreign Application Priority Data

Sep. 2, 1987 [JP] Japan ................. 62-219608

[51] Int. Cl.$^4$ ................................ B60T 8/82
[52] U.S. Cl. ........................ 303/96; 188/181 C; 303/97; 303/100; 303/103
[58] Field of Search ............. 303/91, 94, 95, 96, 303/97, 98, 99, 100, 102, 103, 105, 106, 108, 111; 188/181 C, 181 A, 181 T; 364/426.02, 426.03, 426.01

[56] References Cited

U.S. PATENT DOCUMENTS

| | | | |
|---|---|---|---|
| 3,958,834 | 5/1976 | Takeuchi et al. | 303/103 |
| 4,420,191 | 12/1983 | Arikawa et al. | 303/103 |
| 4,652,060 | 3/1987 | Miyake | 303/96 |
| 4,657,313 | 4/1987 | Fennel et al. | 303/96 |
| 4,718,735 | 1/1988 | Ogino | 303/103 X |
| 4,755,945 | 7/1988 | Kade et al. | 303/96 X |
| 4,802,711 | 2/1989 | Muto et al. | 303/96 |

FOREIGN PATENT DOCUMENTS 2165603 4/1986 United Kingdom.

Primary Examiner—Douglas C. Butler
Attorney, Agent, or Firm—Finnegan, Henderson, Farabow, Garrett and Dunner

[57] ABSTRACT

An antiskid device according to this invention controls the hydraulic pressure to vehicle brakes based on the rotational speed of the wheel having the smallest coefficient of friction until a standard vehicle velocity becomes less than a predetermined velocity. Further, the antiskid device controls the hydraulic pressure to the brakes based on the speed of each wheel if the standard vehicle velocity becomes less than the predetermined velocity. Accordingly, directional stabilization of the vehicle is maintained when the vehicle runs at high speed, and at low speed, the braking range for stopping the vehicle is mainimized by utilizing the braking force more efficiently.

19 Claims, 4 Drawing Sheets

ANTISKID CONTROL DEVICE

This is a continuation of Ser. No. 240,322, filed 9/2/88, now abandoned.

BACKGROUND OF THE INVENTION

This invention relates to an antiskid control device which monitors movements of a vehicle's wheels under braking conditions and minimizes the braking range for stopping the vehicle.

Japanese Laid-open Patent Application No. 61-98663, published without examination on May 16, 1986, discloses an antiskid control device known prior to the present invention. This device comprises a pair of diagonal hydraulic pipe-lines connecting diagonally positioned front and rear brakes on a vehicle, a pair of pressure controllers responsive to the movements of the front wheels preventing the front wheels from locking, and hydraulic pumps driven by rotation of the front wheels for supplying hydraulic pressure to the rear brakes through the pipe-lines.

According to this prior art, the hydraulic pressures to the rear brakes are generated by the pumps in response to the rotational speeds of the corresponding front wheels. Therefore, the hydraulic pressures to the rear brakes are defined by the respective rotational speeds of the corresponding front wheels. Consequently, when the hydraulic pressures to the front wheels are controlled by the pressure controllers, the hydraulic pressures to the rear brakes are also controlled. Therefore, in this prior art, the coefficients of friction between each of the front and rear wheels and a road surface may be utilized efficiently. Thus the braking range for stopping the vehicle can be shortened.

In the conventional; antiskid controlling device, however, the directional stabilization of the vehicle is not consistent with the minimizing of the braking range for stopping the vehicle. Therefore, even if the antiskid controlling device is performing normally, the vehicle may turn left or right suddenly at times against the driver's steering force.

For example, when the vehicle runs on a road where there is packed snow under the right wheels and dry asphalt under the left wheels, if the conventional antiskid control device starts its operation, the front left wheel generates a higher braking force than the front right wheel. Therefore, even if the conventional antiskid control device operates normally, a yawing moment causing the vehicle to turn left may be generated by the difference of the braking forces between front right and front left wheels.

Such yawing moment may be cancelled if a driver steers the vehicle in a proper steering manner. Under normal driving conditions, however, it is difficult for a typical driver to react and to steer the vehicle in the proper manner quickly. Therefore, when the vehicle runs at high speed, it is preferable for the vehicle driver to control the hydraulic pressures to the brakes in order to prevent any yawing moment from being generated.

When the vehicle runs at low speed, even if a yawing moment is generated, the turning of the vehicle can be avoided by manually steering the vehicle against the yawing force. Accordingly, when the vehicle runs at low speed, it is preferable for the vehicle driver to control the hydraulic pressures to the brakes in order to shorten the braking range by utilizing the braking force efficiently.

SUMMARY OF THE INVENTION

Therefore, one of the objects of this invention is to provide an improved antiskid control device without the noted drawbacks of conventional devices.

It is also an object of this invention to prevent a yawing moment from being generated during braking when a vehicle is running at high speed.

Further, it is an object of this invention to minimize the braking area when the vehicle is running at low speed.

To achieve the above objects, and in accordance with the principles of the invention as embodied and broadly described herein, the antiskid control device of the present invention comprises start detecting means for detecting a beginning point for braking; a plurality of wheel speed detecting means for detecting respective rotational speeds of each of the wheels; means for presuming a standard vehicle velocity based on an output of the wheel speed detecting means; comparing means for generating an output when the standard vehicle velocity below a predetermined velocity; selecting means for selecting and outputting a speed of one wheel having the lowest coefficient of friction between the respective wheels and a road surface; and pressure controlling means for controlling hydraulic pressure to brakes which operate in response to an output from the start detecting means, the pressure controlling means executing one pressure control based on the standard vehicle velocity and the respective speeds of each of the wheels when the output from the comparing means appears, and executing another pressure control based on the standard vehicle velocity and the output of the selecting means of wheels when the output from the comparing means disappears.

DETAILED DESCRIPTION OF THE PREFERRED EMBODIMENT

Figure 1:
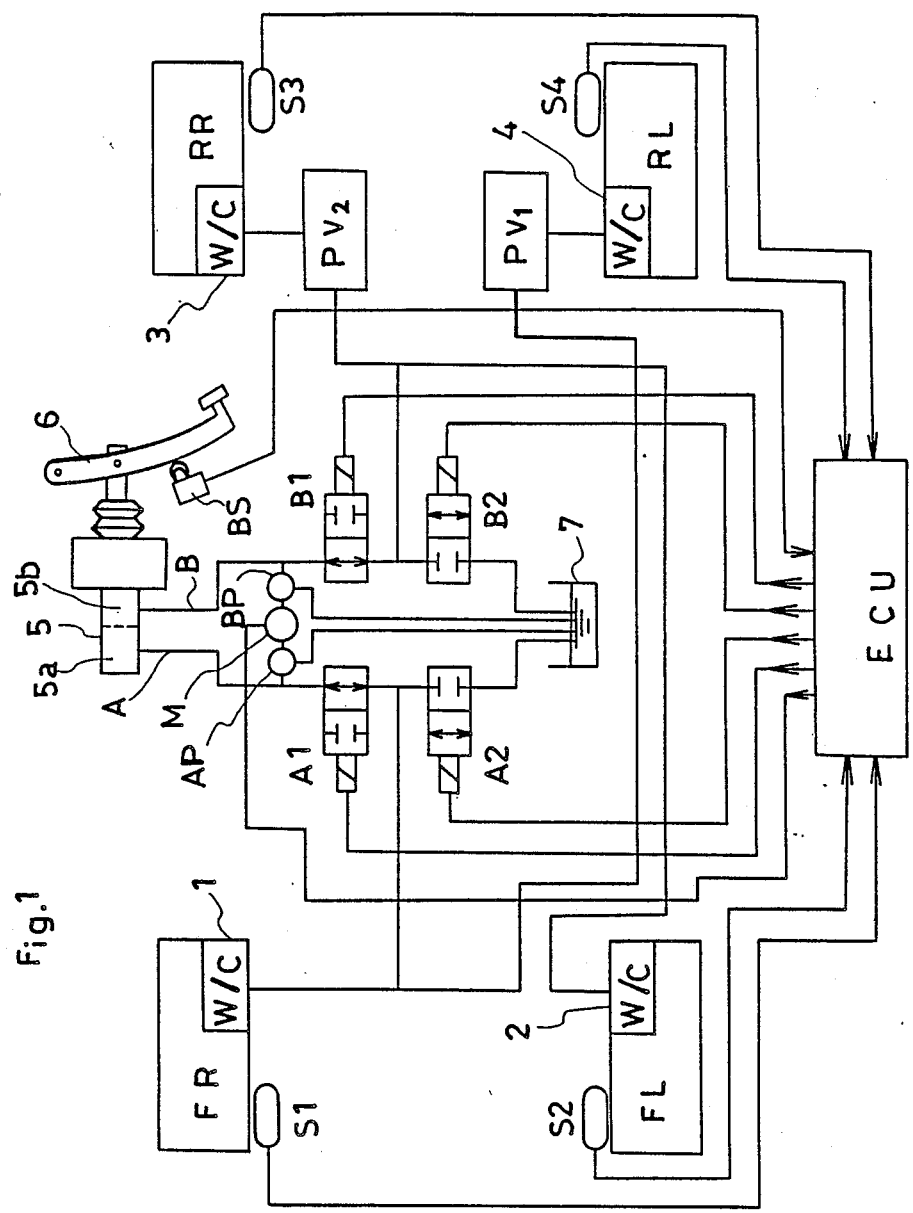
FIG. 1 is a block diagram showing an antiskid control device according to the present invention.

FIG. 1 is a block diagram showing an antiskid control device according to the preferred embodiment.

In FIG. 1, hydraulic pipe-lines comprising a pair of hydraulic pipe lines or lineages (A, B) are provided. The lineage (A) connects a wheel cylinder (1) of a front right wheel (FR) to a wheel cylinder (4) of a rear left wheel (RL). The lineage (B) connects a wheel cylinder (2) of a front left wheel (FL) to a wheel cylinder (4) of a rear right wheel (RR). Such hydraulic pipe-lines typically are called diagonal hydraulic pipe-lines. The lineages (A, B) connect a master cylinder (5) to the wheel cylinders (1, 2, 3, 4). The lineages (A, B) will be explained in detail hereinafter.

During operation, a depression of a brake pedal (6) is converted into hydraulic pressures, which are supplied to each lineage (A, B) from two internal compression chambers (5a, 5b) of the master cylinder (5). Each lineage (A, B) includes electromagnetic valves (A1, A2, B1, B2) for controlling the hydraulic pressures to wheel cylinders (1, 2, 3, 4), pumps (AP, BP) for generating the hydraulic pressures and a reservoir tank (7). The pumps (AP, BP) are driven by a motor (M) and supply the hydraulic pressures to wheel cylinders (1, 2, 3, 4). Further, proportioning valves (PV1, PV2) for adjusting the distribution of the pressures between the front and rear wheels, are connected to the lineage (A, B).

Accordingly, the lineage (A) supplies the hydraulic pressure to the wheel cylinder (1) of the front right wheel (FR) through the electromagnetic valve (A1), and supplies the hydraulic pressure to the wheel cylinder (4) of the rear left wheel (RL) through the electromagetic valve (A1) and the proportioning valve (PV1). Further, the hydraulic pressure supplied to the wheel cylinders (1) and (4) can be discharged to the reservoir tank (7) by opening the electromagnetic valve (A2). Similar to lineage (A), the lineage (b) supplies hydraulic pressure to the wheel cylinder (2) of the front left wheel (FL) through the electromagentic valve (B1), and supplies hydraulic pressure to the wheel cylinder (3) of the rear right wheel (RR) through the electromagnetic valve (B1) and the proportioning valve (PV2). Further, the hydraulic pressure supplied to the wheel cylinders (2, 4) can be discharged to the reservoir tank (7) by opening the electromagentic valve (B2). Meanwhile, the motor (M) and the electromagnetic valves (A1, A2, R1, R2) are controlled by an electronic control unit (ECU). Wheel speed sensors (S1), (S2), (S3) and (S4), which detect the respective rotational speeds of the wheels (FR, FL, RR, RL), are connected to the electronic control unit (ECU). Further, a brake switch (BS), which detects beginning of braking, is also connected to the electronic control unit (ECU). The brake switch (BS) is activated when the brake pedal (6) is depressed.

The electronic control unit (ECU) resumes a standard vehicle velocity based on the outputs of the wheel speed sensors (S1, S2, S3, S4). Further, the electronic control unit (ECU) calculates the coefficients of frictions between the respective wheels (FR, FL, RR, RL) and the surface of a road based on the outputs of the wheel speed sensors (S1, S2, S3, S4). Furthermore, the electronic control unit (ECU) calculates the average speed among the wheels (FR, FL, RR, RL) based on the outputs of the wheel speed sensors (S1, S2, S3, S4).

When the depression of the brake pedal (6) is detected by the brake switch (BS), the electronic control unit (ECU) starts the pressure control for the wheel cylinders (1, 2, 3, 4). If the standard vehicle velocity exceeds a predetermined velocity, the electronic control unit (ECU) executes pressure control based on the movement of the one wheel having the lowest coefficient of the friction among the wheels connected to the same lineage. Conversely, if the standard vehicle velocity is less than the predetermined velocity, the electronic control unit (ECU) executes pressure control based on the average speed among the wheel belonging to the same lineage.

Further, if the deceleration of the wheel and the skid-rate of the wheel agree with a predetermined condition, the electronic control unit (ECU) starts pressure control automatically without detecting the depression of the brake pedal (6) in order to be ready for a breakdown of the brake switch (BS). The above pressure control may be obtained by computers which execute the control in order or in accordance with a logic circuit which executes the control instantaneously.

Figure 2:
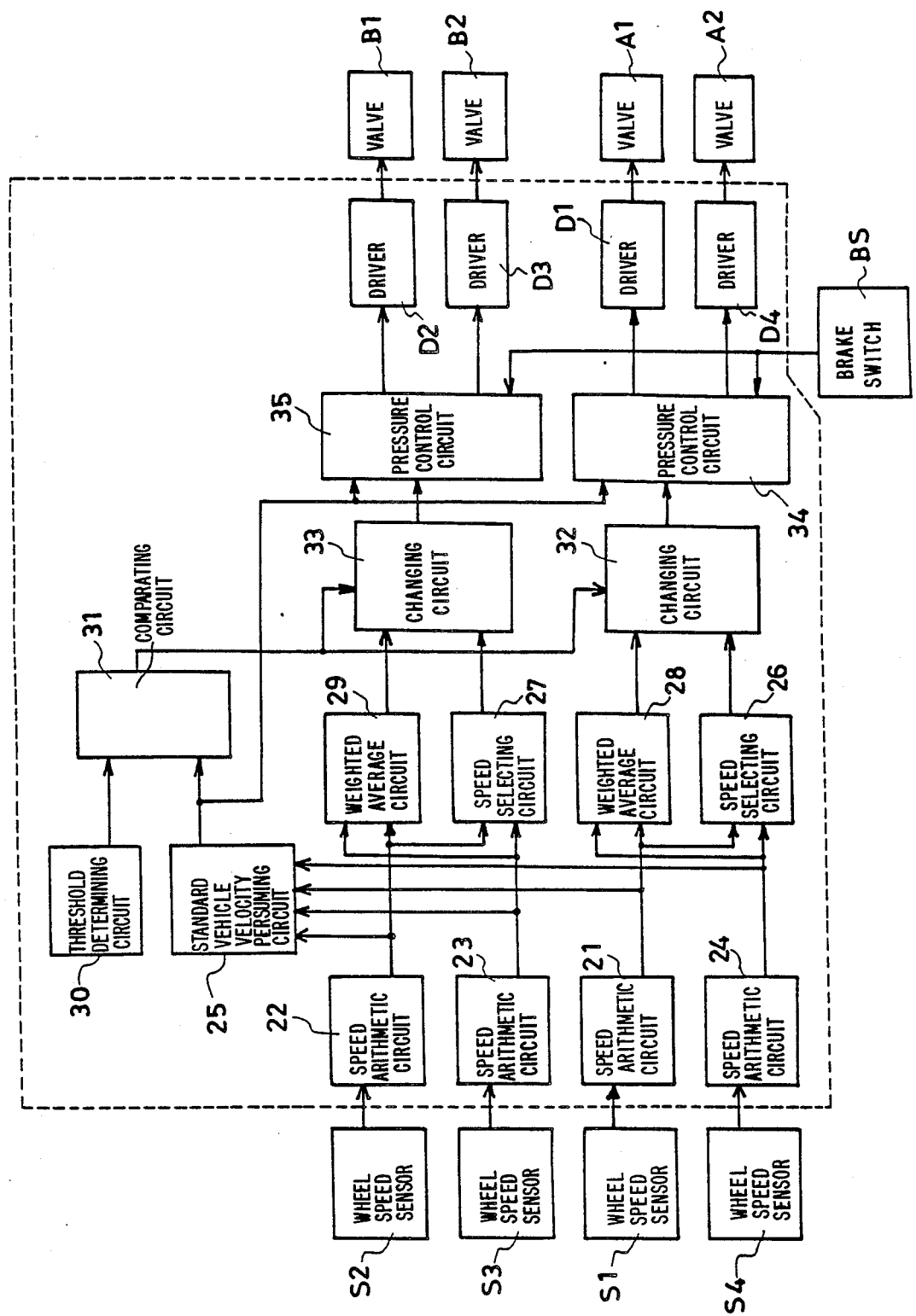
FIG. 2 is a block diagram showing an electronic controlling unit of an antiskid device according to the present invention.

Referring now to FIG. 2, a detailed explanation of the electronic control unit (ECU) will be provided hereinafter. FIG. 2 is a block diagram showing the electronic control unit (ECU). The wheel speed sensors (S1, S2, S3, S4) output electric signals having frequencies corresponding to the rotational speeds of the respective wheels (FR, FL, RR, RL). The electric signals from the respective sensors (S1, S2, S3, S4) are applied to corresponding speed arithmetic circuits (21, 22, 23, 24). The speed arithmetic circuits (21, 22, 23, 24) convert the applied frequencies into levels of voltages corresponding to the wheel speeds.

The output signals from the speed arithmetic circuits (21, 24), which belong to the lineage (A), are applied to a standard vehicle velocity presuming or evaluating circuit (25), a speed selecting circuit (26), and a weighted average circuit (28). Further, the output signals from the speed arithmetic circuits (22, 23), which belong to the lineage (B), are applied to a standard vehicle velocity presuming circuit (25), a speed selecting circuit (27), and a weighted average circuit (29).

The standard vehicle velocity presuming circuit (25) outputs the standard vehicle velocity, which is required for the pressure control. The input-output character of the standard vehicle velocity presuming circuit (25) is shown in the FIG. 3. The standard vehicle velocity presuming circuit (25) renews the standard vehicle velocity into the largest output among the speed arithmetic circuits (21, 22, 23, 24), if at least one of the signals from the speed arithmetic circuits (21, 22, 23, 24) exceeds the standard vehicle velocity. Further, if all of the outputs from the speed arithmetic circuits (21, 22, 23, 24) decelerate more than 1.5 (g), the standard vehicle velocity presuming circuit (25) reduces the standard vehicle velocity at a deceleration of 1.5 (g).

Figure 3:
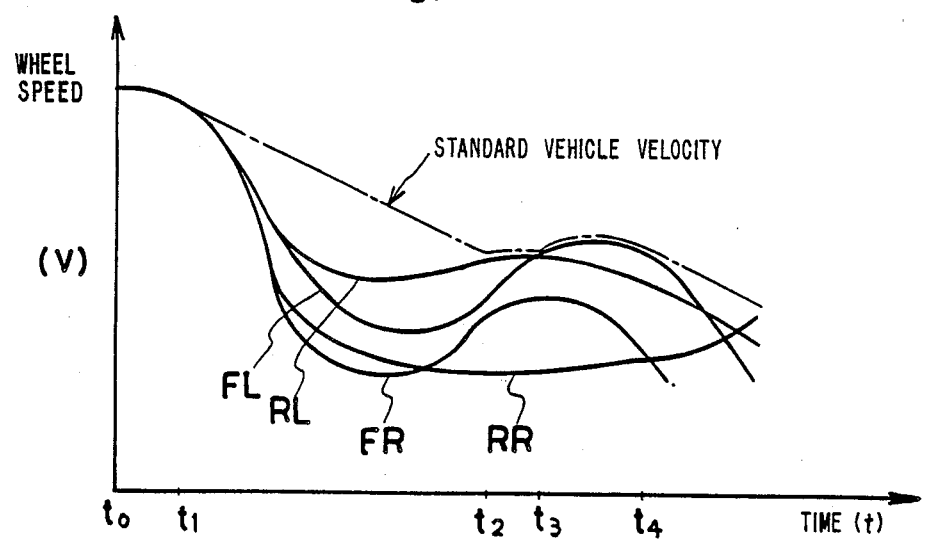
FIG. 3 is a characteristic chart showing the input-output character of a standard vehicle velocity presuming circuit according to the present invention.

For example, under one situation shown in FIG. 3, the standard vehicle velocity presuming circuit (25) makes the standard vehicle velocity correspond to the largest output among the speed arithmetic circuits (21, 22, 23, 24) during a non-braking period (t0–t1), a braking period (t2–t3), and a braking period (t3–t4). Further, the standard vehicle velocity presuming circuit (25) makes the standard vehicle velocity decelerate at the amount of deceleration of 1.5 (g) after a time (t4) or during a braking time (t1–t2) until one of the outputs from the speed arithmetic circuits (21, 22, 23, 24) exceeds the standard vehicle velocity. As described above, the standard vehicle velocity is output continuously from the standard vehicle velocity presuming circuit (25) whether or not the brake pedal (4) is depressed.

Next, the speed selecting circuits (26, 27) will be explained. The speed selecting circuit (26) is the same circuit as the speed selecting circuits (27). Therefore, a detailed explanation of the speed selecting circuits (27) will be omitted. The speed selecting circuit (26) selects and outputs the lowest level output signal (i.e. lowest wheel speed) among the two speed arithmetic circuits (21, 24). That is to say, the speed selecting circuit (26) presumes the coefficients of the friction between road surface and each wheel (FR, RL) belonging to the lineage (A), and then outputs the speed of the wheel having the lowest coefficient of the friction among the two wheels (FR, RL).

Next, the weighted average circuits (28, 29) will be explained. The weighted average circuit (2B) is the same circuit as the weighted average circuit (29). Therefore, a detailed explanation of the weighted average circuit (29) will be omitted.

The weighted average circuit (28) has a character defined by following formulas (100) and (200):

$$V_{out} = \frac{aV1 + V2}{a + b} \quad (100)$$

$$a > b \quad (200)$$

where:
"Vout" is the output voltage of the weighted average circuit (28);
"V1" is the output voltage of the speed arithmetic circuit (21);
"V2" is the output voltage of the speed arithmetic circuit (24); and
both "a" and "b" are positive moduli (i.e., $b \geqq 0$).

As shown in FIG. 2, the speed arithmetic circuits (21, 24) which belong to the lineage (A) are connected to the weighted average circuit (28). Accordingly, a substantially averaged wheel speed "Vout" of the two wheels belonging to the lineage (A) is output from the weighted average circuit (28).

It is well known in the art that the front wheels are more effective than the rear wheels in stopping the vehicle. Accordingly, it is preferable for the pressure control to give weight to the front wheels. Therefore, in this embodiment, the moduli "a" and "b" are established as formula (200). The substantially averaged wheel speed "Vout" from the weighted average circuit (28) weights the front wheels (FR) by defining the moduli "a" and "b" as formula (200). The pressure control, which weights the front wheel (FR), would be obtained in a pressure control circuit (34) by defining the output of the weighted average circuit (28) as formula (200). This is because the pressure control circuit (34) controls the hydraulic pressure to the wheel cylinders (1, 4) based on the output from the standard vehicle velocity presuming circuit (25) and the weighted average circuit (28). A detailed explanation of the pressure control circuit (34) will be provided later.

Next, a comparing circuit (31) connected to the standard vehicle velocity presuming circuit (25), a threshold determining circuit (30) connected to the comparing circuit (31), add changing circuits (32, 33) connected to the comparing circuit (31) will be explained.

Firstly, the threshold determining circuit (30) is explained. The threshold determining circuit (30) outputs a constant voltage corresponding to the predetermined velocity. This predetermined velocity should be established at a vehicle velocity where the vehicle driver can easily steer the vehicle in a proper manner so as to cancel any yawing moment generated by braking the vehicle. In this embodiment, the predetermined velocity is established at 40 (km/h) as a result of much experience.

Secondly, the comparing circuit (31) will be explained. The comparing circuit (31) generates an output signal when the output signal of the standard vehicle velocity presuming circuit (25) is less than the predetermined level established by the threshold determining circuit (30).

Thirdly, the changing circuits (32, 33) will be explained. The changing circuit (32) is the same as the changing circuit (33). Therefore, a detailed explanation of the changing circuit (33) is omitted.

The changing circuit (32) selects and outputs one of the outputs from the weighted average circuit (28) and the speed selecting circuit (26) in response to the output from the comparing circuit (31). If the output signal from the comparing circuit (31) appears, the changing circuit (32) selects and outputs the output signal from the weighted average circuit (28). Conversely, if the output signal from the comparing circuit (31) is not present, the changing circuit (32) selects and outputs the output signal from the speed selecting circuit (26).

When the changing circuit (32) selects the output from the weighted average circuit (28), the pressure control circuit (34) may perform pressure control based on the movements of both wheels (FR, RL) which belong to the lineage (A). This is because the substantially averaged wheel speed among wheels (FR, RL) belonging to the lineage (A), i.e., the output signal of the weighted average circuit (28), is applied to the pressure control circuit (34). Conversely, when the changing circuit (32) selects the output signal from the speed selecting circuit (26), the pressure control circuit (34) may perform pressure control based on the one of the wheels (FR, RL) which has the smallest coefficient of friction. This is because the speed of the wheel which has the smallest coefficient of friction, i.e. the output signal of the speed selecting circuit (26), is applied to the pressure control circuit (34).

Next, the pressure control circuits (34, 35) are explained. The pressure control circuits (34, 35) comprise an electronic circuit including a microprosessing unit. The pressure control circuit (34) is connected to electromagnetic valves (A1, A2) through valve drivers (D1, D4). Accordingly, the pressure in the lineage (A) is controlled by the pressure control circuit (34). Similar to the pressure control circuit (34), the pressure control circuit (35) is connected to the electromagnetic valves (B1, B2) through valve drivers (D2, D3). Accordingly, the pressure in lineage (B) is controlled by the pressure control circuit (35).

The pressure control circuit (34) is the same as the pressure control circuit (35). Further, the pressure control circuit (34) is independent of the pressure control circuit (35). Therefore, a detailed explanation of the pressure control circuit (35) has been omitted.

The main functions of the pressure control circuit (34) are as follows:
(a) calculation of the skid-rate;
(b) judgement for starting a skid-rate control;
(c) skid-rate control based on the standard vehicle velocity and the wheel speed; and
(d) judgement for terminating the skid-rate control.

Figure 4:
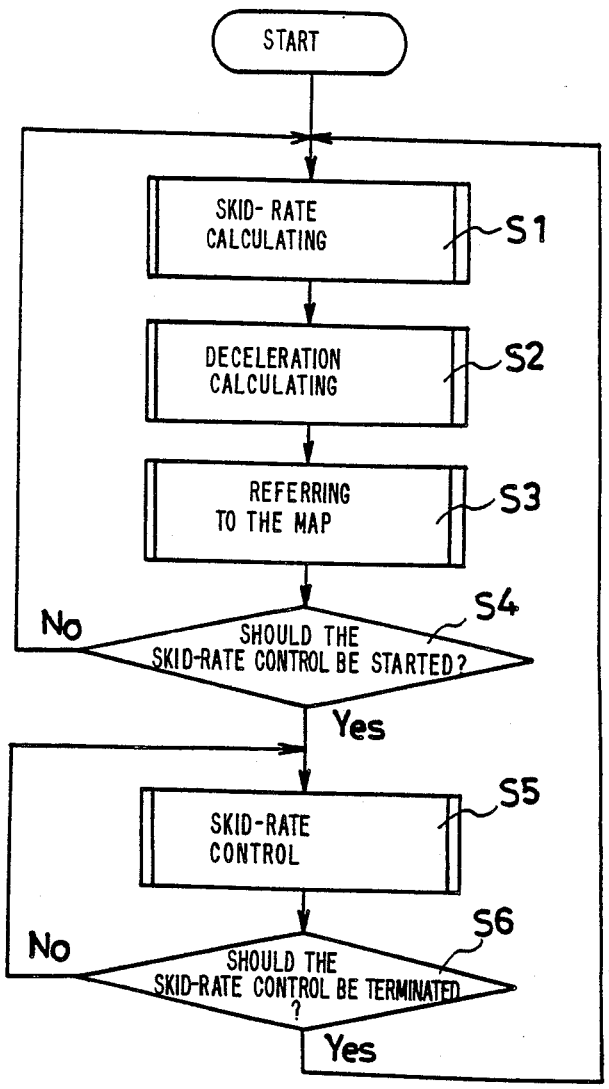
FIG. 4 is a flowchart showing steps performed in a pressure control circuit according to the present invention.

FIG. 4 is a flowchart showing the steps in the pressure control circuit 35 for controlling pressure.

Firstly, the "calculation of the skid-rate" is explained. The skid-rate is calculated in a step (S1). The standard vehicle velocity from the standard vehicle velocity presuming circuit (25) and the wheel speed selected by the changing circuit (32) are applied to the pressure control circuit (34). The pressure control circuit (34) calculates the skid-rate based on following formula (300).

$$Sk = \frac{Vs - Vw}{Vs} \times 100 \qquad (300)$$

where:
"Sk" is the skid-rate (%);
"Vs" is the standard vehicle velocity; and
"Vw" is the wheel speed.

Figure 5:
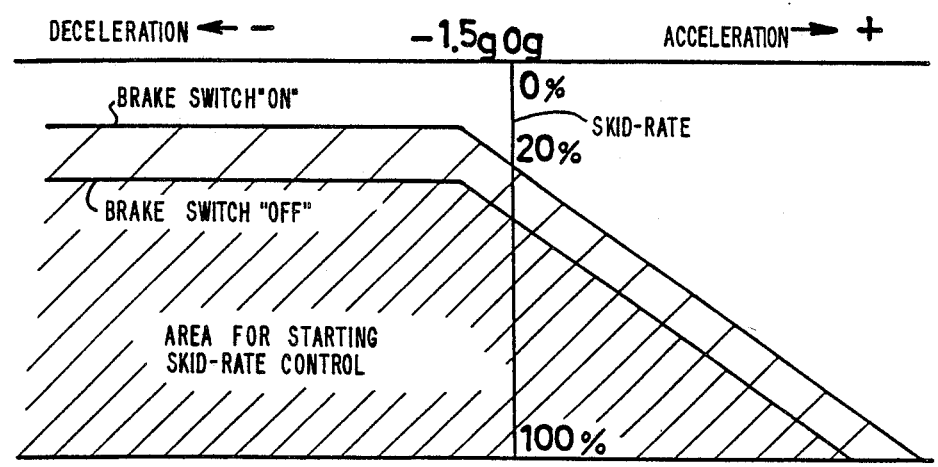
FIG. 5 is a characteristic chart showing a starting map stored in a memory of a pressure control circuit according to the present invention.

Secondly, the "judgement for starting the skid-rate control" is explained. The judgement is executed in steps (S2, S3, S4). In the step (S2), the deceleration of the wheel is defined by calculating a differential of the applied wheel speed selected by the changing circuit (32). In the step (S3), a map is referenced based on the skid-rate and the deceleration of the wheel. FIG. 5 is a characteristic chart showing the map stored in the pressure control circuit (34). The map defines whether the skid-rate control should be started or not. In the step (S4), the pressure control circuit (34) judges whether a condition based on the skid-rate and the deceleration of the wheel is within the obliquely lined area of FIG. 5. If the condition is within the obliquely lined area, the pressure control circuit (34) starts the skid-rate control. However, if the condition is outside of the obliquely lined area, the pressure control circuit (34) does not start the skid-rate control.

Meanwhile, the antiskid control device of this embodiment includes a brake switch (BS), which detects the depression of the brake pedal (6). By using the brake switch (BS), the pressure control circuit (34) can make clear whether or not the brake pedal (6) is depressed. Therefore, if the brake switch (BS) is utilized for the "judgement for starting the skid-rate control", the pressure control circuit (34) does not incorrectly start the skid-rate control. Accordingly, the obliquely lined area of the map is changed in response to turning on of the brake switch (BS) in the pressure control circuit (34) of this embodiment. The turning on of the brake switch (BS) corresponds to the depression of the brake pedal (6). When the brake switch (BS) turns on, skid-rate control is started under an optimum skid-rate. Therefore, the skid-rate control is started as soon as possible after beginning of the braking. Further, even if the depression of the brake pedal (6) is not detected due to breakdown of the brake switch (BS), etc., when the skid-rate and the deceleration of the wheel is within the obliquely lined area of the map, skid-rate control is started nevertheless.

Next, "skid-rate control based on the standard vehicle velocity and the wheel speed" is explained. The skid-rate control is executed in step (S5). It is well known in the art that the braking force for stopping the vehicle is in the most favorable condition if the skid-rate is almost 20(%). Accordingly, if the skid-rate is maintained at almost 20(%) by increasing or decreasing the hydraulic pressures applied to each lineage (A, B), the braking range for stopping the vehicle can be minimized. Such skid-rate control is obtained by opening or closing the electromagnetic values (A1, A2, B1, B2). However, detailed explanation of the skid-rate control has been introduced in many publications already. Therefore, the detailed explanation for this pressure control has been omitted from this specification.

Lastly, the "judgement for terminating the skid-rate control" is explained. The judgement is executed in step (S6). The pressure control circuit (34) terminates the skid-rate control if the standard vehicle velocity from the standard vehicle velocity presuming circuit (25) is less than a base velocity. The base velocity is established as a speed just before the vehicle is stopped. In this embodiment, the base velocity is established at about 10 (km/h). Further, the pressure control circuit (34) terminates the skid-rate control if the brake pedal (6) is released and the brake switch (BS) is turned off. Conversely, the pressure control circuit (34) continues the skid-rate control if the standard vehicle speed exceeds the base velocity and the brake switch (BS) is turned on.

As described above, when the vehicle runs at higher velocity than the predetermined velocity established by the threshold determining circuit (30), the hydraulic pressures to the wheel cylinders (1, 2, 3, 4) are controlled by the pressure control circuit (34) in order to prevent a yawing movement from being produced. However, when the vehicle runs at lower velocity than the predetermined velocity, the hydraulic pressures to the wheel cylinders (1, 2, 3, 4) are controlled in order to minimize the braking range by utilizing the braking force efficiently. Therefore, safety of the vehicle on any icy or wet road is greatly improved by the antiskid control device according to this embodiment.

Various modifications may be made in the invention without departing from the scope or spirit of the invention.

What is claimed is:

1. An antiskid control device for a vehicle having a plurality of wheels each with a hydraulic pressure-actuated brake, and a movable brake pedal for applying hydraulic pressure to the brakes, comprising:
   start detecting means for detecting the initial movement of the brake pedal during braking;
   means for detecting the rotational speed of each of the plurality of wheels, and generating at prescribed intervals a wheel speed signal corresponding to the rotational speed of each wheel;
   presuming means responsive to the speed detecting means for generating at the prescribed intervals a standard vehicle speed signal corresponding to one of a predetermined speed and the highest speed of any of the plurality of wheels;
   selecting means for generating at the prescribed intervals one of a low coefficient signal corresponding to the rotational speed of the one of the wheels having the lowest coefficient of friction with the driving surface and a low speed signal corresponding to the rotational speed of the one of the wheels having the lowest rotational speed; and
   pressure control means responsive to the start detecting means for automatically controlling the hydraulic pressures applied to each of the brakes in response to the standard vehicle speed signal and the wheel speed signals when at least one of the wheel speed signals corresponds to a speed below than a specified level, and the standard vehicle speed signal and one of the low coefficient signal and the low speed signal when all of the wheel speed signals correspond to a speed below the specified level.

2. The device of claim 1, wherein the pressure control means includes comparing means for generating a comparison output signal when the wheel speed signal corresponds to a speed less than the specified level, and the device also includes averaging means for generating an average signal corresponding substantially to the average speed of at least two of the wheels, the pressure control means being responsive to the standard vehicle speed signal and the average signal when the comparing means generates the comparison output signal.

3. The device of claim 2, wherein the start detecting means also includes means for generating a skid-rate signal corresponding to the skid-rate of each wheel, means for generating a deceleration rate signal corresponding to the rate of deceleration of each wheel, and means for storing a plurality of predetermined relationships between skid-rate and rate of deceleration for controlling the hydraulic pressures applied to each of the brakes in response to the skid-rate signal and the deceleration rate signal.

4. The device of claim 3, wherein the plurality of predetermined relationships includes a first optimum relationship and a second better than optimum relationship, and the device includes changing means for selectively changing between the first and second relationships.

5. The device of claim 2, wherein the comparing means includes means for storing the specified level and means for comparing the speed corresponding to the wheel signal with the specified level.

6. The device of claim 2, wherein the pressure control means includes switch means for selectively outputting one of the low coefficient signal and the average signal, and skid control means for maintaining the skid-rate of the vehicle within a prescribed substantially optimum range.

7. The device of claim 1, wherein the vehicle includes a plurality of pipelines for connecting the brakes with a source of hydraulic pressure, the speed detecting means includes at least two speed detecting circuits, each for detecting the rotational speed of a different plurality of the wheels, the selecting means includes at least two selecting circuits, and the pressure control means includes at least two pressure control circuits, one of the pressure control circuits for controlling the hydraulic pressure in each of the pipelines, respectively.

8. An antiskid control device comprising:
   start detecting means for detecting a beginning of braking;
   a plurality of wheel speed detecting means for detecting a respective rotational speeds of wheels;
   presuming means for presuming a standard vehicle velocity based on an output of the wheel speed detecting means;
   comparing means for generating an output when the standard vehicle velocity becomes under predetermined velocity;
   selecting means for selecting and outputting a speed of one wheel having the lowest coefficient of friction between the respective wheels and a road surface; and
   pressure controlling means for controlling hydraulic pressures to brakes which starts its operation in response to an output from the starting detecting means and executes one pressure control based on the standard vehicle velocity and the respective speeds of wheels when the output from the comparing means appears, and executes the other pressure control based on the standard vehicle velocity and the output of the selecting means of wheels when the output from the comparing means disappears.

9. An antiskid control device according to claim 8, wherein the start detecting means further comprising:
   depression detecting means for detecting a depression of a brake pedal;
   means for calculating skid-rates of the wheels;
   means for calculating decelerations of the wheels;
   means for memorizing predetermined conditions; and
   means for judging the braking based on the skidrate and the deceleration.

10. An antiskid control device according to 9, wherein said memorizing means further comprises:
   a first condition memorizing means for memorizing an area for starting a skid-rate control based on an optimum skid-rate;
   a second condition memorizing means for memorizing an area for starting the skid-rate control based on a higher skid-rate than the optimum skid-rate; and
   means for choosing the first and the second memorizing means selectively in response to the depression of the brake pedal.

11. An antiskid control device according to claim 8, wherein said comparing means further comprising:
   means for memorizing the predetermined velocity; and
   means for comparing the standard velocity with the predetermined velocity.

12. An antiskid control device according to claim 8, further comprising averaging means for calculating an average speed among the wheels,
   thereby the pressure controlling means control the hydraulic pressures based on a standard vehicle velocity and selected signals from the averaging means when the output from the comparing means appears.

13. An antiskid control device according to claim 12, wherein said pressure controlling means further comprising:
   changing means for selectively putting out one on the outputs from the selecting means and the averaging means; and
   skid controlling means for maintaining a skid-rate with an optimum range.

14. An antiskid control device comprising:
   start detecting means for detecting a beginning of braking;
   a plurality of wheel speed detecting means for detecting a respective rotational speeds of wheels;
   presuming means for presuming a standard vehicle velocity based on an output of the wheel speed detecting means;
   comparing means for generating an output when the standard vehicle velocity becomes under predetermined speed;
   selecting means for selecting and outputting a speed of one wheel having the lowest rotational speed; and
   pressure controlling means for controlling hydraulic pressures to brakes which starts its operation in response to an output from the starting detecting means and executes one pressure control based on the standard vehicle velocity and the respective speeds of wheels when the output from the comparing means appears, and executes the other pressure control based on the standard vehicle velocity and the output of the selecting means of wheels when the output from the comparing means disappears.

15. An antiskid control device according to claim 14, wherein the start detecting means further comprising:
   depression detecting means for detecting a depression of a brake pedal;

means for calculating skid-rates of the wheels;
means for calculating decelerations of the wheels;
means for memorizing predetermined conditions; and
means for judging the braking based on the skidrate and the deceleration.

16. An antiskid control device according to claim 15, wherein said memorizing means further comprising:
   a first condition memorizing means for memorizing an area for starting a skid-rate control based on an optimum skid-rate;
   a second condition memorizing means for memorizing an area for starting the skid-rate control based on a higher skid-rate than the optimum skid-rate; and
   means for choosing the first and the second memorizing means selectively in response to the depression of the bake pedal.

17. An antiskid control device according to claim 14, wherein said comparing means further comprising:
   means for memorizing the predetermined velocity; and
   means for comparing the standard velocity with the predetermined velocity.

18. An antiskid control device according to claim 14, further comprising averaging means for calculating an average speed among the wheels,
   whereby the pressure controlling means control the hydraulic pressures based on the standard vehicle velocity and selected signals from the averaging means when the output from the comparing means appears.

19. An antiskid control device according to claim 18, wherein said pressure controlling means further comprising:
   changing means for selectively putting out one on the outputs from the selecting means and the averaging means; and
   skid controlling means for maintaining a skid-rate within an optimum range.

* * * * *

UNITED STATES PATENT AND TRADEMARK OFFICE
CERTIFICATE OF CORRECTION

PATENT NO. : 4,896,924

DATED : January 30, 1990

INVENTOR(S) : Kazutaka Kuwana, Tsuyoshi Yoshida, Shinsuke Sakane, Tetsuya Miyachi It is certified that error appears in the above-identified patent and that said Letters Patent is hereby corrected as shown below:

Title page:

In the Abstract: line 12, "mainimized" should read --minimized--.

Claim 1, col. 8, line 59, "below" should read --above--.

Signed and Sealed this

Nineteenth Day of March, 1991

*Attest:*

HARRY F. MANBECK, JR.

*Attesting Officer*   *Commissioner of Patents and Trademarks*